(12) United States Patent
Andrew et al.

(10) Patent No.: US 10,627,246 B2
(45) Date of Patent: Apr. 21, 2020

(54) MULTI MODAL ANNOTATION OF MAPS

(71) Applicant: Microsoft Technology Licensing, LLC, Redmond, WA (US)

(72) Inventors: Felix Andrew, Seattle, WA (US); Silvana Moncayo, Seattle, WA (US); Katherine Anne Maertens, Redmond, WA (US); Myron Thomas, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 229 days.

(21) Appl. No.: 15/081,673

(22) Filed: Mar. 25, 2016

(65) Prior Publication Data

US 2017/0276497 A1  Sep. 28, 2017

(51) Int. Cl.
*G01C 21/34* (2006.01)
*G01C 21/36* (2006.01)

(52) U.S. Cl.
CPC ..... *G01C 21/3423* (2013.01); *G01C 21/3626* (2013.01); *G01C 21/3641* (2013.01)

(58) Field of Classification Search
CPC ........... G01C 21/3415; G01C 21/3632; G01C 21/20; G01C 21/34; G01C 21/343; G01C 21/3664; G01C 22/006; G01C 21/00; G01C 21/32; G01C 21/3446; G01C 21/3492; G01C 21/36; G01C 21/3641; G01C 21/3644; G01C 21/3661; G01C 21/3667; G01C 21/367; G01C 21/3673; G01C 21/3676; G01C 21/3682; G01C 23/00; G04G 21/02; G04G 9/0064; G04G 17/04; G04G 21/00; G04G 21/08; G04G 21/04
See application file for complete search history.

(56) References Cited

U.S. PATENT DOCUMENTS 7,509,215 B2   3/2009   Shen et al.
7,945,852 B1   5/2011   Pilskalns
(Continued)

FOREIGN PATENT DOCUMENTS

WO   WO2008083735 A1   7/2008

OTHER PUBLICATIONS

De Carolis et al., "Generating Personalized Tourist Map Descriptions," In Proceedings of 18th International Conference on Industrial and Engineering Applications of Artificial Intelligence and Expert Systems, Jun. 22, 2005, 11 pages.
(Continued)

*Primary Examiner* — Tuan C To
*Assistant Examiner* — Kelly D Williams
(74) *Attorney, Agent, or Firm* — Arent Fox LLP

(57) ABSTRACT

Techniques for modifying and presenting instructions for traversing a route include obtaining original instructions and receiving input to modify the instructions. The instructions may be modified and/or annotated based on the input received to provide more intuitive and helpful instructions for traversing a route. The modified instructions may be presented to a user of a computing device as the computing device traverses the route. The modifications and/or annotations to the original instructions may be presented as the computing device traverses the route based at least in part on the location and/or speed of the computing device on the route.

19 Claims, 7 Drawing Sheets

(56) References Cited

U.S. PATENT DOCUMENTS

| | | | |
|---|---|---|---|
| 8,306,749 B1 | 11/2012 | Petersen et al. | |
| 8,462,176 B1 | 6/2013 | Stubbs et al. | |
| 9,037,402 B2 | 5/2015 | Simring | |
| 9,418,672 B2* | 8/2016 | Pylappan | H04L 5/00 |
| 2002/0120397 A1* | 8/2002 | Kepler | G01C 21/3644 |
| | | | 701/426 |
| 2004/0209600 A1* | 10/2004 | Werner | H01Q 1/273 |
| | | | 455/414.1 |
| 2004/0230371 A1 | 11/2004 | Vincent et al. | |
| 2006/0064241 A1 | 3/2006 | Rasmussen et al. | |
| 2007/0258642 A1 | 11/2007 | Thota | |
| 2008/0040036 A1* | 2/2008 | Peters | G01C 3/04 |
| | | | 701/491 |
| 2009/0292462 A1* | 11/2009 | Babetski | G01C 21/3641 |
| | | | 701/533 |
| 2010/0106603 A1 | 4/2010 | Dey et al. | |
| 2010/0185933 A1 | 7/2010 | Coffman et al. | |
| 2010/0235078 A1 | 9/2010 | Chen et al. | |
| 2011/0320114 A1 | 12/2011 | Buxton et al. | |
| 2012/0159371 A1 | 6/2012 | Thrapp et al. | |
| 2013/0317746 A1 | 11/2013 | Babetski | |
| 2014/0156188 A1 | 6/2014 | Hart et al. | |
| 2014/0358438 A1* | 12/2014 | Cerny | G01C 21/00 |
| | | | 701/537 |
| 2015/0193416 A1 | 7/2015 | Hagiwara et al. | |
| 2015/0241235 A1* | 8/2015 | Lobato Fregoso | G01C 21/36 |
| | | | 701/423 |
| 2017/0254663 A1* | 9/2017 | McGavran | G01C 21/3632 |

OTHER PUBLICATIONS

Mandal et al., "Personalised Route-Map Generation using Crowd Sourced GPS Traces," In Proceedings of 2nd International Conference on Business and Information Management, Jan. 9, 2014, 5 pages.

"Scribblemaps," retrieved on Jan. 28, 2016, published Dec. 3, 2013, 2 pages.

"International Search Report and Written Opinion Issued in PCT Application No. PCT/US2017/023271", dated Oct. 18, 2017, 18 Pages.

* cited by examiner

MULTI MODAL ANNOTATION OF MAPS

BACKGROUND

Mapping services that provide directions to consumer computing devices have become commonplace today. For instance, many consumer computing devices include mapping services, such as map applications, which provide directions from one location to another location. Additionally, these mapping services often provide the directions in the form of turn-by-turn instructions, which may be output to a user of a consumer computing device visibly, audibly, or by a combination of both. However, often the directions provided from these mapping services contain inaccuracies, are vague or unclear, are not user-specific, and/or do not take into account other traveling conditions (e.g., traffic conditions, weather conditions, scenic opportunities, etc.). While improvements to these mapping services are continually being implemented, the directions provided by these mapping services still have various shortcomings.

SUMMARY

This disclosure describes techniques for annotating maps, modifying instructions provided by mapping services, and presenting the modified instructions on computing devices. The techniques described herein allow users of computing devices to modify and/or annotate instructions provided by these mapping services to provide more intuitive and helpful driving instructions. The techniques include obtaining instructions for traversing a route from a start location to an end location, where the instructions include waypoints along the route and segments which span distances between the waypoints. The instructions may be presented in a user interface on a display of a computing device, and input may be received via the user interface from a user of the computing device. In some examples, presenting the instructions for traversing a route may comprise presenting (i) a map view (e.g., graphical representation), (ii) a list of instructions, or (iii) a combination of both. The instructions may be modified based at least in part on the input. For instance, the instruction text associated with a waypoint or a segment may be modified, a waypoint or a segment may be added to a route along with instructions associated with the added waypoint or segment, instructions associated with a waypoint or segment can be deleted, an image can be associated with a waypoint or segment, a reminder can be associated with a waypoint or a segment, and/or audio data can be associated with a waypoint or a segment of the instructions. In some examples, modifying the map view may automatically modify the instruction list, and vice versa. For instance, upon selecting a waypoint or segment presented graphically in the map view, annotations or modifications made to the waypoint or segment may be automatically made to the list of instructions.

In various examples, modifications or annotations may be made to maps that are global modifications or annotations. For example, a geo-fence (i.e., a virtual perimeter for a real-world geographic area represented by maps), or other predefined location on a map, may be associated with global annotations. As an example, if a route passes through a pre-defined geo-fence that is associated with a local grocery store that a user frequents, an annotation may be presented to the user as a reminder for buying groceries.

Additionally, the techniques described herein include presenting instructions that have modifications and/or annotations made to them. Such techniques may include obtaining instructions for traversing a route from a start location to an end location, where the instructions include original instructions provided by a mapping service and modifications and/or annotations to the original instructions. A computing device may receive a command to output the instructions for traversing the route. To output the instructions, the computing device may interpret the modifications and/or annotations to the original instructions. The location of the computing device may be monitored, and the instructions may be output by the computing device based at least in part on the location of the computing device. When the computing device is approaching a location on the route having a modification or annotation, the computing device may output the modification or annotation.

The techniques described herein can facilitate simple modification and annotation of map data and navigation instructions. By enabling users to modify and annotate map data and instructions, more accurate and helpful instructions are delivered to users of mapping services. Additionally, the techniques described herein may result in more efficient and effective use of display space for computing devices by, for example, eliminating unnecessary or confusing instructions. In some instances, the amount of instructions may be reduced, or changed, which may result in lesser bandwidth requirements in transmitting the instructions, as well as lesser processing requirements for processing and outputting the instructions. In this way, processing loads for processors of the computing devices may be reduced. Accordingly, the techniques described herein may facilitate simple interactions between users and map instructions, more efficiently and effectively present instructions to users, and result in more efficient processing of instructions.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
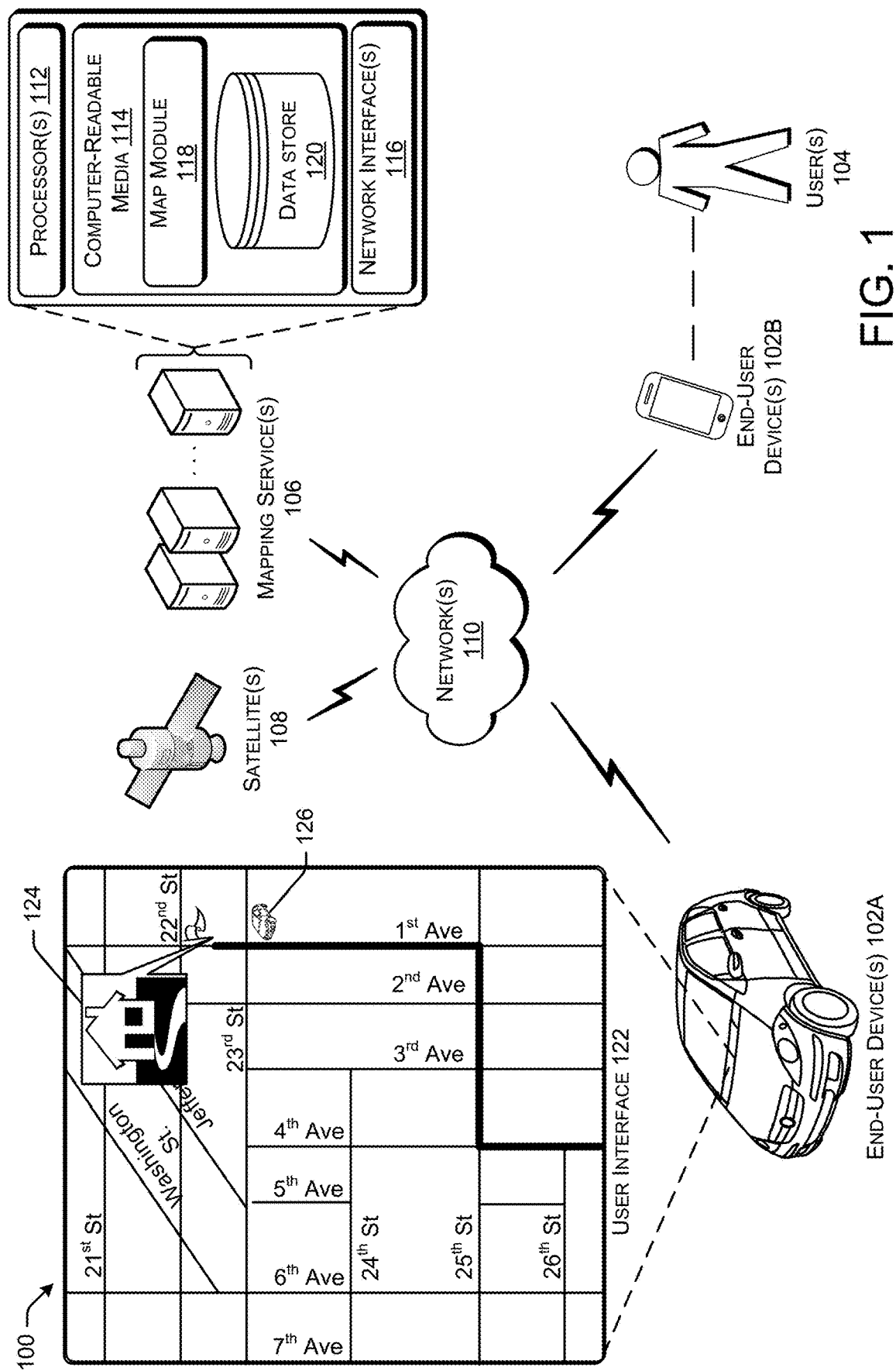
FIG. 1 is a schematic diagram showing an example environment for creating, transferring, and presenting modified instructions for traversing a route.

This disclosure describes techniques for modifying instructions for traversing a route and presenting the modified instructions on one or more computing devices. In some examples, a computing device may obtain original instructions for traversing a route from a mapping service (e.g., BING® Maps, GOOGLE® Maps, WAZE®, SCOUT®, MapQuest®, Garmin®, Tom Tom®, etc.). For instance, a mapping service may send original instructions for traversing a route to the computing device. In some examples, the instructions may comprise waypoints and segments spanning between the waypoints. For purposes of this discussion, a waypoint is a reference point in physical space and/or virtual space used for purposes of navigation. A waypoint may be associated with a location on a map, such as a split in a road, or a ramp to enter an interstate. A segment is a stretch of road, trail, or other channel for traversing a route. For instance, a segment may be a portion of road spanning between two waypoints. In some examples, various maneuvers or events in the instructions may be associated with waypoints and/or segments, such as an instruction to "make a left turn," or to "merge onto the interstate." The computing device may contain modules which make modifications to the original instructions based on input received from a user of the computing device. The modifications may provide more intuitive and helpful instructions than the original instructions provided by the mapping service. In some examples, the modifications may give more detailed instructions to a hard to find house or an often missed turn. For instance, in one specific example, a modification may include an annotation to a waypoint, such as ink data comprising text identifying and/or an arrow pointing to the entrance of a driveway for a house.

The modifications may comprise any type of modifications to the original instructions, such as modifying text associated with a waypoint or a segment, associating a waypoint or a segment with the instructions, deleting a waypoint or segment from the instructions, associating image content with a waypoint or segment of the instructions, associating a reminder with a waypoint or a segment of the instructions, associating audio data with a waypoint or a segment of the instructions, and/or adding a suggestion as to optional routes a user of the computing device can choose to traverse based on various conditions associated with each route (e.g., traffic conditions, weather conditions, road conditions, scenic conditions, etc.). The conditions may be present conditions (e.g., snow falling on roads, recent car wreck, etc.), or predicted conditions (e.g., approaching storm, traditionally bad traffic at an upcoming time of day, fall foliage during a particular time of year, etc.). The conditions may be based on historical conditions, such as traffic that is historically worse at certain times of day, or on known future conditions, such as a road being closed all summer for construction.

The instructions may be presented to a user including the modifications and/or annotations. For instance, a first user may utilize a first computing device to create the modifications to the instructions, and send the modified instructions to a second computing device associated with a second user. The second user may then use the second computing device to output the modified instructions to traverse a route, which may result in the second user having more helpful and intuitive instructions presented to them than the original instructions. For example, when approaching a destination, rather than simply reading "you have arrived at your destination," the modified instructions may read "my house is the last on the block with a red door and rose bushes lining the driveway." In some examples, during navigation, instructions that were deleted may not be presented to a user and/or may be replaced with alternate instructions. For instance, rather than reading off each step for traversing a route from a user's house to a freeway known to a user, the instructions may simply instruct the user to get on the freeway heading north.

The instructions may be presented in various manners and using various configurations of devices. In some examples, a first portion of the modified instructions may be presented using a first mobile computing device and a second portion of the modified instructions may be presented using a second mobile computing device. For instance, turn-by-turn directions may be presented by a navigation device (e.g., GPS, in-dash navigation system, etc.), while photos, videos, and/or other annotation information may be displayed by a mobile device (e.g., phone, tablet, wearable device, etc.). In various examples, a visual portion of the instructions may be output using the first mobile computing device, and an audio portion of the instructions may be output using the second mobile device. In some examples, the in-dash computing device may present visual annotations, and the mobile phone computing device may present audible annotations. For example, an in-dash computing device and a mobile phone computing device may be used in conjunction to present a directed drive to a company, point of interest, or other destination or via a directed route. A few specific examples may include a curated drive to a winery (or other destination) with points of interest displayed on one device and images or video presented on another device, a tour of civil war battlefields with points of interest presented on one device and commentary presented on another device, a scenic motorcycle tour with a route presented on one device and with supplemental information about locations that cater to motorcyclists on another device, a route displayed on one device with music or playlists associated with various locations along the route being output by another device.

In some examples, the instructions for traversing a route may be presented or output to a user of a computing device based at least in part on the location of the computing device. For instance, the location of the computing device may be monitored using one or more modules or systems associated with the computing device (e.g., Global Positioning System (GPS)) and, based on the location of the computing device and/or the speed at which the computing device is traversing the route, present an annotation or modified instructions. For example, if the modules or systems associated with the computing device determine that the computing device is approaching a segment or waypoint, annotations or modification associated with the segment or waypoint may be output via the computing device.

As described herein, the annotations may be received and/or presented in various formats and using various methods. For instance, annotations may comprise virtual objects received from a user interacting with the instructions in a virtual environment, such as a holographic environment. Similarly, the annotations may be presented as virtual objects in a virtual environment and using virtual reality devices (e.g., MICROSOFT HOLOLENS®, OCCULUS RIFT®, etc.) In some examples, interactions of the user with the instructions may be identified in the virtual environment and mapped to an appropriate action in the virtual environment.

The techniques described herein may be implemented by a mapping service, a service provider other than a mapping service (e.g., a third party web or cloud service), one or more local applications running on user computing device, combinations of the foregoing, or the like. While the techniques described herein are with reference to modifying original instructions for traversing roads using vehicles, the techniques can be utilized for other types of activities. For instance, the techniques may be used for running paths, bicycle paths, or for navigation within a virtual environment. However, these are only a few examples of other industries where the techniques described herein may be utilized, but it should be appreciated that the techniques may be applied in a plurality of industries.

Illustrative Environments

FIG. 1 is a schematic diagram showing an example environment 100 for creating, transferring, and presenting modified instructions for traversing a route. The example environment 100 can include one or more end-user devices 102 (e.g., 102A and 102B) associated with one or more users 104, one or more mapping services 106, and one or more satellites 108 which communicate over one or more networks 110.

The end-user devices 102A and 102B may contain one or more modules configured to create and present original instructions and/or modified instructions. For instance, end-user devices 102A and 102B may obtain original instructions (e.g., receive original instructions from mapping service(s) 106 and via network(s) 110), and user(s) 104 of end-user device(s) 102A and 102B may use modules stored on end-user device(s) 102A and 102B to create modifications or annotations to the original instructions. In some examples, end-user device(s) 102 may comprise a single end-user computing device, while in other examples, such as the example shown in FIG. 1, end-user device(s) 102 may comprise multiple computing devices. Further, in some examples, a single user 104 may employ end-user device(s) 102A and 102B, while in other examples, end-use devices 102A and 102B may belong and/or be employed by different users.

Upon obtaining original instructions, end-user devices 102A and/or 102B may be utilized to modify the original instructions. For instance, annotations may be added to the original instructions. Examples of the modifications and annotations made to the original instructions are discussed further below with respect to FIGS. 2-4. In some examples, end-user device 102B may be utilized to create modifications to the original instructions, and once the modifications have been made, the modifications may be sent to end-user device 102A and/or mapping service(s) 106. In some examples, mapping service(s) 106 may serve as a repository for storing modified instructions for user(s) 104, or various groups of users. In this way, user(s) 104 may access modified instructions using any end-user device(s) 102 associated with the user by accessing mapping service(s) 106. In some examples, groups of people (e.g., families, friends, users of similar vehicles) may be allowed access to various modified instructions created by user(s) 104, while other users may be restricted from accessing the modified instructions stored at mapping service(s) 106. In some examples, a user 104 may use end-user device 102B to create the modified instructions, and send the modified instructions to a user of end-user device 102A for use in traversing a route. For instance, a user 104 may create modified instructions using end-user device 102B, such as a mobile phone or desktop computer, and send the modified instructions to end-user device 102A, such as a car, for presentation while traversing a route.

As noted above, the end-user device(s) 102A and 102B may be in communication with mapping service(s) 106. As described herein, mapping service(s) 106 may be implemented as one or more computing devices, one or more servers, one or more desktop computers, or any other computing device which includes one or more processors communicatively coupled to memory. The one or more computing devices may be configured in a cluster, data center, cloud computing environment or a combination thereof. Mapping service(s) 106 may comprise one or more processors 112, computer-readable media 114 communicatively coupled to the processor(s) 112, and one or more network interfaces 116. The processor(s) 112 may include a central processing unit (CPU), graphics processing unit (GPU), a microprocessor, and so on. The computer-readable media 114 may store a map module 118 and a data store 120. The map module 116 may comprise computer-readable instructions that, when executed, perform various operations. For instance, the map module 118 may obtain, or be utilized by an administrator of mapping service(s) 106 to obtain, original instructions for traversing a route. In some examples, the map module 118 may create a plurality of original instructions for traversing a plurality of routes and store the plurality of instructions in data store 120. In various examples, the map module 118 may receive the plurality of original instructions for traversing the routes from other entities, such as through a licensing agreement or other transaction. In various examples, data store 120 may further include modifications made to the original instructions. The modifications may have been created by an administrator of the mapping service(s) 106. In other examples, the modifications may be received from users of mapping service(s) 106, such as user(s) 104. Further, the map module 118 may send and receive original instructions and modifications to the instructions using network interface(s) 116. Network interface(s) 116 enable communications between end-user device(s) 102A and 102B, satellite(s) 108, and any other devices configured to communicate on network(s) 110. Such network interface(s) 116 can include one or more network interface controllers (NICs) or other types of transceiver devices to send and receive communications over network(s) 110.

Network(s) 110 may include any one of or a combination of multiple different types of networks, such as cellular networks, wireless networks, Local Area Networks (LANs) Wide Area Networks (WANs), Personal Area Networks (PANs), and the Internet.

As noted above, end-user device(s) 102 may obtain modified instructions and present the modified instructions to a user, such as user(s) 104. As shown in FIG. 1, a user interface 122 may be displayed on a display of end-user device 102A to present modified instructions for traversing a route. As shown in user interface 122, a modification to the original instructions has been made in the form of an image 124. As shown in FIG. 1, the image 124 may comprise a picture of an end destination of the route. The original instructions may have simply shown the route ending at the destination without any more details or information regarding the destination. In the example shown in user interface 122, the image 124 may comprise a picture of a house that the user is driving to. In this way, rather than having to locate an address on a house as a user traverses the route, the user of end-user device 102A may simply observe the image 124 to quickly locate the destination house they are trying to reach. Further, as noted above, the image 124 may be presented in response to determining a location 126 of the end-user device 102A on the route. For example, one or more modules of end-user device 102A may monitor the location 126 of end-user device 102A, and based on the location 126 and/or the speed of end-user device 102A, present the image 124 on user interface 122. To determine the location 126 and/or speed of end-user device 102A, end-user device 102A may be in communication with satellite(s) 108. Using GPS technology, the signals received from satellite(s) 108 may be used to monitor the location 126 and/or speed of end-user device 102A. While the location 126 and speed of end-user device 102A are described using GPS technologies, any other technology usable to determine location and/or speed of a computing device may be employed herein, such as cellular, Wi-Fi, and/or vehicle sensors (e.g., compass, accelerometer, etc.). Further examples and details of presenting the modifications and/or annotations to original instructions are further discussed below with respect to FIGS. 2-7.

Figure 2:
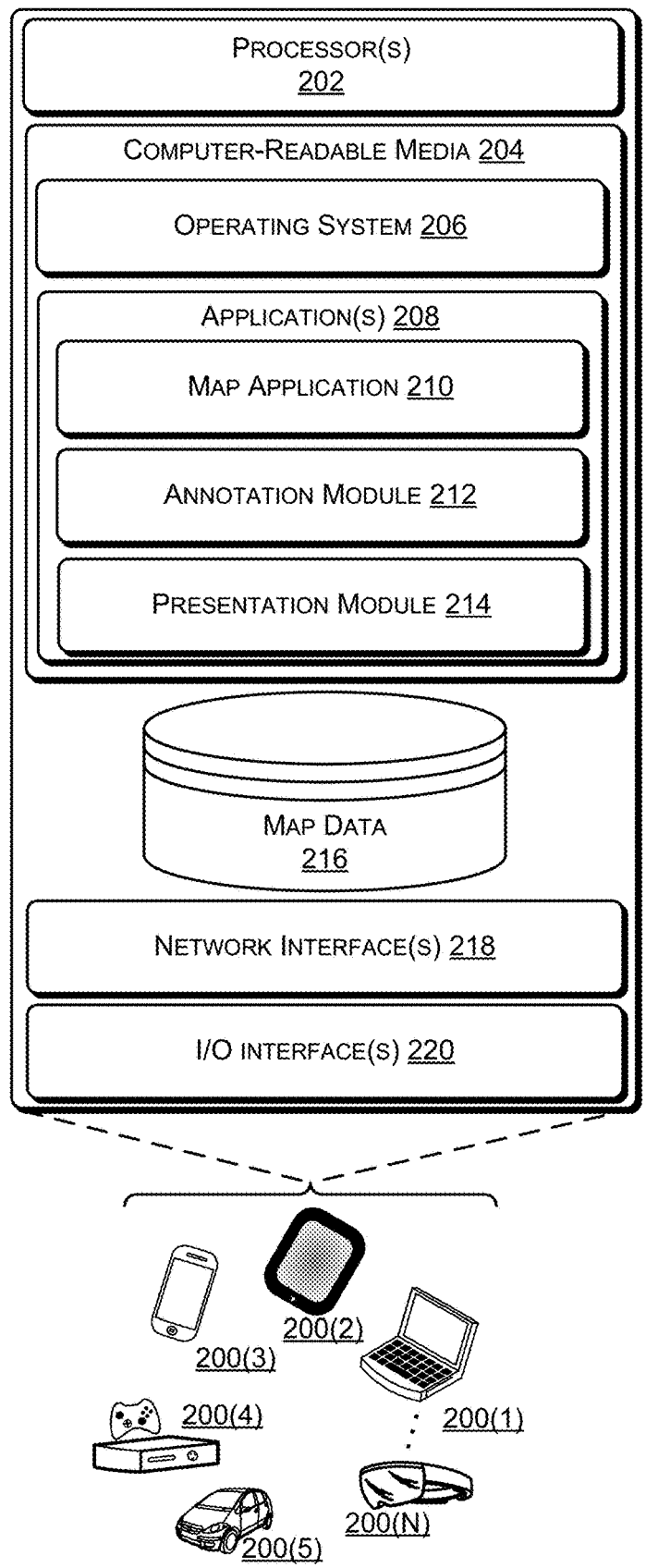
FIG. 2 is a schematic diagram showing an example computing device for creating and presenting modified instructions for traversing a route.

FIG. 2 is a schematic diagram showing an example computing device(s) 200 for creating and presenting modified instructions for traversing a route. In some examples, example computing device(s) 200 may be an example of an end-user device 102. Computing device(s) 200 can belong to a variety of categories or classes of devices such as traditional client-type devices, desktop computer-type devices, mobile devices, special purpose-type devices, embedded-type devices, and/or wearable-type devices. By way of example and not limitation, computing device(s) 200 can include, but are not limited to, server computers or engines, laptop computers, or other mobile computers (e.g., 200(1)), computer navigation client computing devices, satellite-based navigation system devices including global positioning system (GPS) devices and other satellite-based navigation system devices, personal data assistants (PDAs), and other specialized portable electronic devices, tablet computers or tablet hybrid computers (e.g., 200(2)), smartphones, mobile phones, mobile phone-tablet, or other telecommunication devices (e.g., 200(3)), portable or console-based gaming devices or other entertainment devices (e.g., 200(4), represented graphically as a gaming device), automotive computers such as vehicle control systems, vehicle security systems, autonomous vehicles, or any other type of computing device associated with a transportation means (e.g., car, bus, train, ferry, etc.) (e.g., 200(5), represented graphically as an automobile), wearable computers such as smart watches or biometric or medical sensors, or smart glasses, (e.g., 200(N), represented graphically as smart glasses) desktop computers, or integrated components for inclusion in computing devices, appliances, or other computing device(s).

Computing device(s) 200 can represent any type of computing device having one or more processor(s) 202 operably or communicatively connected to computer-readable media 204 such as via a bus, which in some instances can include one or more of a system bus, a data bus, an address bus, a PCI bus, a Mini-PCI bus, and any variety of local, peripheral, and/or independent buses. Processors(s) 202 can represent the same units and/or perform the same functions as processor(s) 112, described above. Computer-readable media 204 can represent computer-readable media 114 as described above. Computer-readable media 204 can include components or modules that facilitate modifying original instructions and presenting the modified instructions. The components or modules can represent pieces of computer-readable code executing on a computing device, such as computing device(s) 200. The components can include operating system 206, one or more applications 208 including a map application 210 and an annotation module 212, and a presentation module 214. The operating system 206 may manage resources of computing device(s) 200 and/or provide functionality to application(s) 208. The application(s) 208 may be various applications, such as map application 210, a web browser, a mobile application, a desktop application, or any other application. In one example, the map application 210 may cause sending and receiving of original instructions and/or modified instructions between a server, such as mapping service(s) 106, and computing device(s) 200. In some examples, annotation module 212 may be included in the application(s) 208, such as the map application 210. However, in other examples, annotation module 212 may be included in the operating system 206, or a combination of both the operating system 206 and the application(s) 208. Similarly, while presentation module 214 is illustrated as being included in application(s) 208, in some examples, the presentation module 214 may be included in operating system 206, or a combination of both the operating system 206 and the application(s) 208.

In some examples, the annotation module 212 can enable users of computing device(s) 200 to modify original instructions. For instance, annotation module 212 can obtain original instructions. In some examples, map application 210 may be used on behalf of, or in conjunction with, annotation module 212 to obtain the original instructions. For instance, one or both of the map application 210 and annotation module 212 may enable a user of computing device(s) 200 to select original instructions and/or modified instructions. For example, one or both of annotation module 212 and map application 210 may receive input from a user of the computing device(s) 200 regarding a desired end location the user wishes to travel to. In such instances, the annotation module 212 and/or map application 210 may present a user interface on a display of computing device(s) 200 to enable a user to select original instructions or modified instructions for traversing various routes from a starting location to the desired end location.

Once the instructions are obtained, annotation module 212 may present the instructions (e.g., original instructions, modified instructions, etc.) in various user interfaces for editing the instructions, described in more detail below with respect to FIGS. 3 and 4. The user interfaces presented, or outputted, by annotation module 212 may include various controls for modifying or annotating the obtained instructions. As described later, the instructions may be presented as a textual list of instructions (e.g., waypoints, segments, maneuvers, etc.), or as a graphic representation of the instructions on a map. For instance, the graphic representation may comprise a bird's eye view of a map with the route overlaid on it, or perspective views from various viewpoints following the computing device(s) 200 as it traverses the route.

The modifications or annotations made to the instructions may include various types of data, such as ink data, image data, textual data, script files, video data, three-dimensional object data, and/or audio data. In some examples, the ink data may comprise annotations or modifications to graphical representations of the instructions on a map. For instance, a user may draw an arrow, or other symbol, on the graphical representation of the instructions on a map. In some examples, the annotation module 212 may include a stroke recognizer to determine what stroke the user is making. For instance, a user may draw an arrow on the graphical representation of the instructions on the map that points to an exit on a freeway a user is supposed to take. The stroke recognizer may identify the stroke of the user as an arrow form, and input an arrow at the location drawn on by the user. In other examples, user interfaces presented by the annotation module 212 may contain sets of selectable objects or icons that a user can select to place on the graphical representation of the instructions on the map. For instance, the user may select (e.g., click, click and drag, etc.) an object, such as an arrow or pin, and place the object at a desired location. In this way, the ink data may provide additional detail to the instructions.

In some examples, the image data may comprise photographs, drawings, videos, computer-generated images, pictures or other types of image content the user can add to the graphical representation of the instruction on the map. For instance, if an end location of the instructions is a house, a picture of the house may be associated with the end location (i.e., waypoint). The textual data may comprise annotations or modifications to the instructions comprising text. For example, various waypoints or segments of the textual instructions may be added, deleted, or modified. For example, rather than instructions stating "you have arrived at your destination," or "your destination is on the right," the original instructions may be modified by a user of computing device(s) 200 to recite "my house is on the corner of the block with the red door and rose bushes."

In some examples, the textual data may include a suggestion, or option, for a user to traverse the route. For instance, the instructions to traverse the route may reach a waypoint where either a left turn or a right turn may be made to take sub-route A or sub-route B to reach the end destination. The annotation module 212 may receive textual data to be associated with the waypoint as an annotation and provide a suggestion as to which sub-route to take. For instance, the suggestion may state "take sub-route A between 2:00 pm and 5:00 pm, otherwise take sub-route B." In some examples, the annotation providing the suggestion may further include one or more script files. A script file is an executable file configured to perform one or more operations. For instance, a script file may call components of computing device(s) 200, such as application(s) 208 and/or application programming interfaces (APIs), to perform various operations. For example, the script files may call various components of computing device(s) 200 to obtain information such as current traffic conditions for a route (e.g., car wreck, slow moving traffic, toll bridge out or service, ferry out of service, etc.), current weather conditions for a route (e.g., severe weather, severe road conditions, etc.), or any other type of information that may be of use in suggesting a route to traverse. In some examples, the traffic conditions, weather conditions, and/or scenic conditions may be input by a user (i.e., administrator) associated with a mapping service that provides original instructions, such as mapping service(s) 106. In other examples, the traffic conditions, weather conditions, and/or scenic conditions may be received by the annotation module 212 from a user of the computing device(s) 200. For example, a user may know of a local fruit stand and annotate, via the annotation module 212, a waypoint or segment of the instructions to present visibly and/or audibly that "if the fruit stand is open here, stop by for some fresh cherries."

In various examples, the annotation module 212 may receive audio data that is to be associated as an annotation with a segment or waypoint of the instructions. In some examples, the audio data may be a recording of a user giving directions. In such examples, annotation module 212 may further comprise a voice recognizer. The voice recognizer may convert the recorded audio data into textual data. Audio data may also comprise a sound track. In some examples, annotation module 212 may annotate a segment of a route with a soundtrack appropriate for that segment. For example, the annotation module 212 may receive input to annotate a segment of the route through downtown Seattle, Wash. with a Nirvana song or a Jimi Hendrix song. However, annotation module 212 may annotate the instructions with any type of audio data.

The presentation module 214 may be configured to present, or output, the instructions (i.e., original instructions and modifications). The presentation module 214 may be configured to output the instructions in a user interface displayed on a display of the device. In some examples, the presentation module 214 may present the instructions as visual instructions, audio instructions, or a combination of both. In various examples, the visual instructions may comprise a list of textual instructions, a graphical representation of the instructions displayed on a map, or a combination of both. In some instances, the presentation module 214 may present different portions of the instructions on displays of multiple computing device(s) 102. In various examples, the audio instructions may be presented in a voice of a virtual assistant (e.g., CORTANA®, SIRI®, etc.) and/or presented in a voice of one or more users of computing device(s) 200.

As noted above, the presentation module 214 may present the instructions and annotations in various manners, such as a graphical representation of the instructions displayed on a map. In some examples, the graphical representation may be presented as a bird's eye view, a three-dimensional view, a satellite view, or any other view of the map with the graphical representation of the route overlaid on it. In other examples, the presentation module 214 may present the instructions from various perspective viewpoints following the computing device(s) 200 as it traverses the route. In some instances, the presentation module 214 may determine a viewpoint at which the graphical representation is being presented at. For instance, a user may change viewing angles. Based on the viewpoint, the presentation module 214 may present the annotations along a plane substantially parallel to plane (i.e., billboarding) defined by a display of the computing device(s) 200.

In some examples, the presentation module 214 may comprise instructions for interpreting the annotations received by annotation module 212. For instance, the presentation module may interpret the annotations and/or modifications made by annotation module 212 and present them in the same manner as the original instructions are presented. Further, the annotations and/or modifications may be interpreted by presentation module 214 to be seamlessly implemented into the original instructions. The presentation module 214 may be implemented on multiple of computing device(s) 200 simultaneously to output the instructions.

In various examples, the presentation module 214 may monitor the location of the computing device(s) 200 as it traverses the route laid out by the instructions. For instance, presentation module 214 may employ GPS technologies, cellular network location systems, or any other type of system to monitor and determine the location of computing device(s) 200 as it traverses the route. In some examples, the annotations in the instructions may be presented based at least in part on the location and/or speed of the computing device(s) 200 as it traverses the route. In some examples, presentation module may present an annotation based on the computing device(s) 200 passing through a pre-defined location. For instance, one or more geo-fences or specific locations may be associated with global annotations (i.e., annotations which are applied to all original instructions). As described herein, a geo-fence is a virtual perimeter for a real-world geographic area represented by maps. The geo-fences and/or the predefined locations may be defined by inputs received at annotation module 212. Further, annotation module 212 may associate pre-defined annotations with the geo-fences and predefined locations. For example, if a route passes through a pre-defined geo-fence that is associated with a local grocery store that a user frequents, presentation module 214 may present an annotation to the user as a reminder for buying groceries. In various examples, the geo-fences and/or the predefined locations may be defined by a user of computing device(s) 200. For instance, annotation module 212 may receive input from a user of computing device(s) 200 defining a geo-fence and/or a pre-defined location. Further, the annotation module 212 may receive input from the user of computing device(s) 200 to associate an annotation with the geo-fence and/or pre-defined location. The presentation module 214 may then present the associated annotation when a computing device is traversing a route that passes through the geo-fence. For instance, the presentation module 214 may present, visibly and/or audibly, "look at this house that's for sale on the left" when a computing device traversing a route passes through, or near, the geo-fence or predefined location.

The computer-readable media 204 of computing device(s) 200 may further include or store map data 216. Map data 216 may comprise original instructions for traversing a route and/or annotations made to the original instructions. For example, map data 216 may store textual data, image data, audio data, ink data, video data, three-dimensional object data, or any other type of data for annotating or modifying original instructions.

As noted above, the computing device(s) 200 may include network interface(s) 218. The network interface(s) 218 may be the same as network interface(s) 116. The network interface(s) 218 can include one or more network interface controllers (NICs) or other types of transceiver devices to send and receive communications over networks, such as network(s) 110. Network interface(s) 218 may be configured to communicate over network(s) 110 to send and receive instructions, modifications, and/or annotations to other computing devices. For instance, modifications and annotations may be sent from computing device(s) 200 to mapping service(s) 106.

Additionally, the computing device(s) 200 may include I/O interface(s) 220 to allow computing device(s) 200 to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like). In some examples, the I/O interface(s) include a display to present user interfaces, and receive input via the screen (e.g., touch display). Further, annotations and modifications may be received via the peripheral devices, such as a keyboard, a mouse, or a voice input device. In some examples, the I/O interface(s) 220 may comprises cameras or sensors to identify actions of a user in a virtual environment. For instance, a user may interact with a virtual reality (VR) computing device or other gesture input device (e.g., MICROSOFT HOLOLENS®, OCCULUS RIFT®, MICROSOFT KINECT®, etc.) which maps inputs such as actions, gestures, and movements of a user to appropriate actions in the virtual reality environment. Similarly, the I/O interface(s) 220 may include displays or components for presenting annotations or modifications in a VR environment.

Device(s) 200 may comprise any type of computing device including, but not limited to, a laptop computer, a tablet, a smart phone, a desktop computer, a server, an electronic reader device, a mobile handset, a personal digital assistant (PDA), a portable navigation device, a watch computing device, a portable media player, a computer monitor or display, a set-top box, a computer system in a vehicle, an autonomous vehicle, an appliance, a camera, a robot, a security system, a game console, a smart television (TV), a smart car, glasses, and so forth. In some instances, the end-user device(s) 102A and 102B may comprise mobile devices, while in other instances the devices may be stationary devices. In at least one example, the device(s) 104 can include virtual reality and/or mixed reality (VR/MR) devices (e.g., CANON® MREAL® System, MICROSOFT® HOLOLENS®, OCCULUS RIFT®, etc.).

Processor(s) 112 and 202 can represent, for example, a CPU-type processing unit, a GPU-type processing unit, a HPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processor(s) 112 and 202 can execute one or more modules and/or processes to cause the modules and applications to perform a variety of functions, as set forth above and explained in further detail in the following disclosure. Additionally, each of the processor(s) 112 and 202 can possess its own local memory, which also can store program modules, program data, and/or one or more operating systems.

In some examples, various operations described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc.

The computer-readable media 114 and 204 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. As defined herein, computer storage media does not include communication media.

Figure 3:
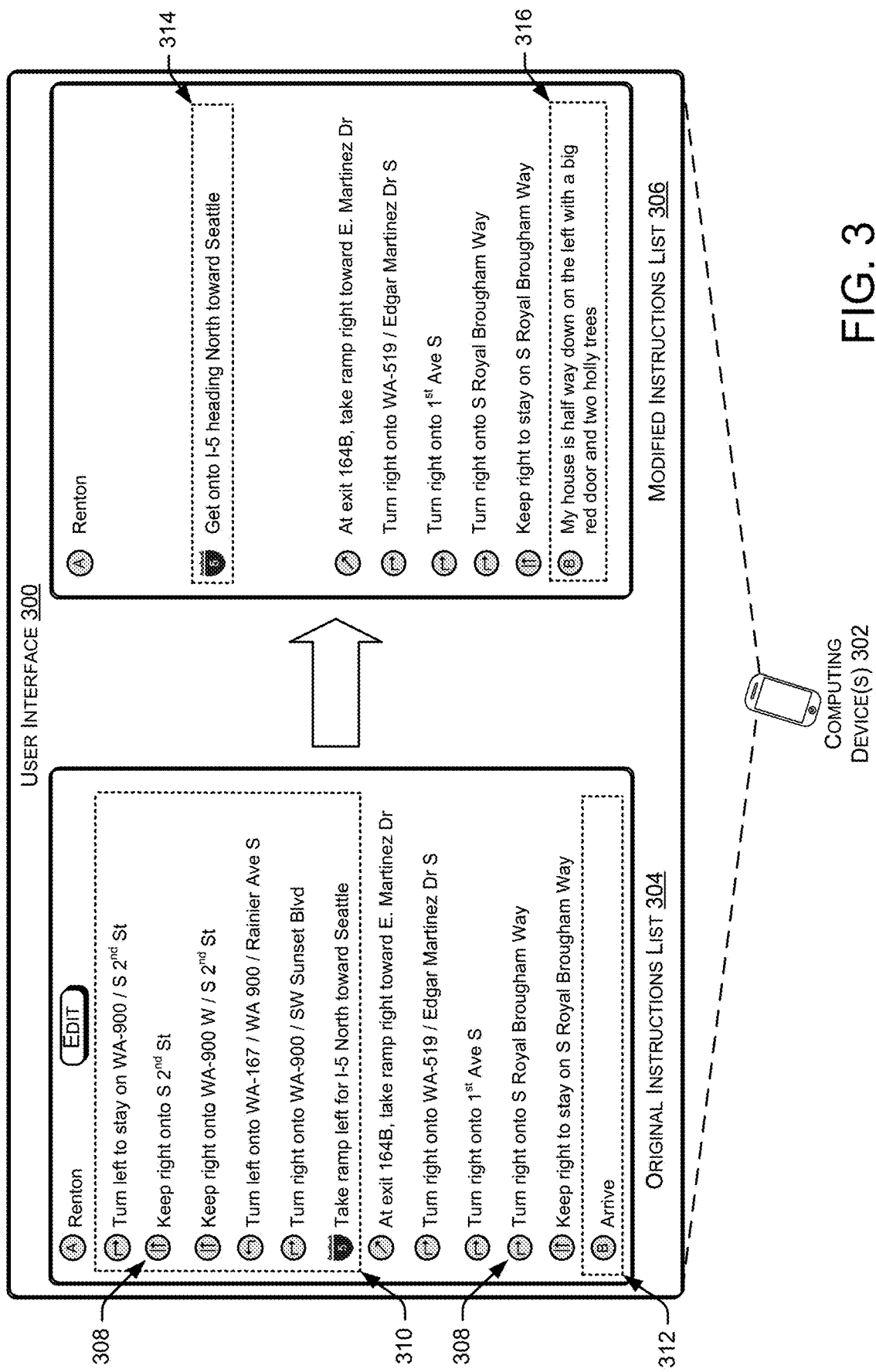
FIG. 3 is a schematic diagram of an example user interface for modifying textual instructions for traversing a route.

FIG. 3 is a schematic diagram of an example user interface 300 for modifying textual instructions for traversing a route. User interface 300 may be presented on a display of computing device (s) 302, which may be any type of computing device usable to present instructions for traversing a route and receive modifications to the instructions, such as computing device(s) 200. In some examples, user interface 300 may be output by a module, such as annotation module 212. User interface 300 may include an original instructions list 304 and a modified instructions list 306. However, in other examples, a single list may be presented or additional lists. Additionally, in some examples a graphical representation of the original or modified instructions may be overlaid on a map. As shown, the original instructions list 304 and modified instructions list 306 may include multiple waypoints 308. In some examples, segments spanning distances between the waypoints 308 may be presented as well, as shown in FIG. 4. In order to edit the original instructions list, annotation module 212 may receive input indicating which portion of the text of the original instructions list. In some instances, user interface 300 may include an edit button selectable by a user to edit original instructions list 304. In other instances, the annotation module 212 may receive a selection (e.g., voice selection, cursor selection, etc.) of the particular text to be edited via user interface 300. In some instances, the original instructions may be presented alongside a graphical representation of the instructions on a map. In such instances, the annotation module 212 may receive a selection of a segment or waypoint of the instructions presented on the map, and the annotation module 212 may receive a selection of a waypoint or segment presented on the map. In response to receiving this selection, the annotation module 212 may enable modification of text presented in the original instructions list 304 corresponding to the selected waypoint or segment. Even further, the annotation module 212 may automatically edit the original instructions list 304, or the graphical representation of the original or modified instructions overlaid on a map, in response to receiving an input. For example, annotation module 212 may receive input, such as touch input or pervasive pen input, and automatically enter into an edit mode. The annotation module 212 may receive the input and edit the original instructions to include an annotation corresponding to the input, such as a textual annotation, and automatically edit the original instructions to include the input annotation.

As shown in FIG. 3, annotation module 212 has received a selection of text 310 and text 312 for editing. When text 310 and 312 are selected, annotation module 212 may enable editing of the text. In some examples, editing of the text may comprise deleting waypoints and/or segments of the instructions, adding waypoints and/or segments to the instructions, or modifying text of waypoints and/or segments of the instructions. In an example, annotation module 212 may enable selection and editing of text 310 to create text 314. As shown in FIG. 3, instructions in text 310 may be deleted and modified. For instance, text 310 comprises instruction for traveling from Renton, Wash. to Interstate 5 North. However, a user that lives in Renton may be familiar with how to reach I-5. Accordingly, a user may wish to delete and modify text 308 to simply recite "Get onto I-5 heading North toward Seattle," rather than having to listen to or view instructions the user already is familiar with. Additionally, as shown in FIG. 3, text 312 of the original instructions list 304 may be modified to result in text 316 in modified instructions list 306. For example, rather than simply reciting "arrive" as text 312 recites, the text 312 may be modified to recite more detailed instructions such as "My house is half way down on the left with a big red door and two holly trees," as shown in text 316. In this way, annotation module 212 may facilitate modification of textual instructions in original instructions list 304 to present more intuitive and helpful instructions as shown in modified instruction list 306.

Figure 4:
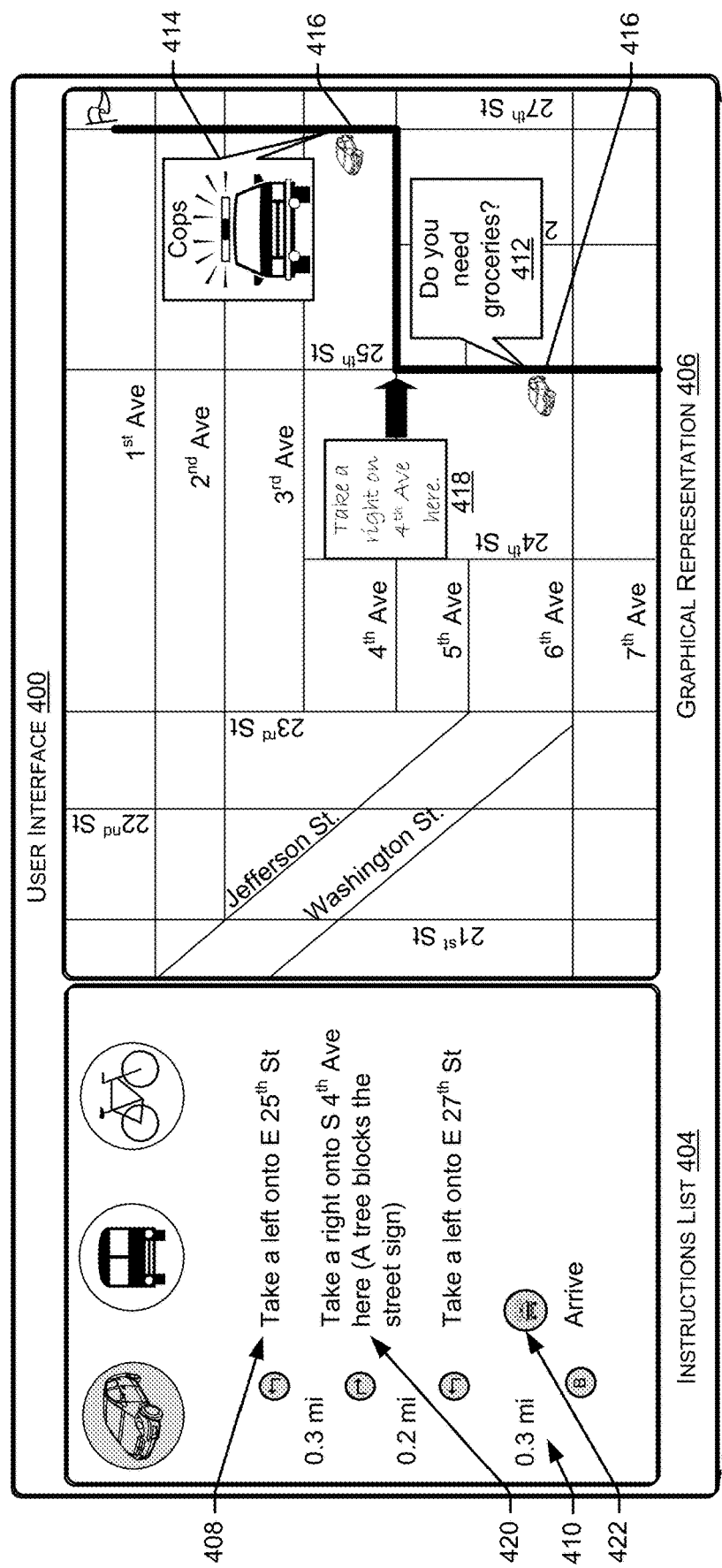
FIG. 4 is a schematic diagram showing an example user interface for presenting instructions for traversing a route.

FIG. 4 is a schematic diagram showing an example user interface 400 for presenting instructions for traversing a route. User interface 400 may be presented on a display of computing device(s) 402, which may be any type of computing device usable to present instructions for traversing a route, such as computing device(s) 200. As shown in FIG. 4, user interface(s) 400 may present the instructions as an instructions list 404 and a graphical representation 406. Instructions list may present textual instructions, including multiple waypoints 408 and segments 410. In some examples, the instructions list 404, or any other portion of user interface(s) 400, may include an indication of a type of transportation associated with the instructions.

In some examples, the graphical representation 406 of the instructions may include annotations 412 and 414. As shown in FIG. 3, annotation 412 may be associated with the first segment of segments 410. Annotation 412 may comprise any type of data noted above, such as textual data, image data, audio data, etc. As noted above, presentation module 214 may present annotations based on the location of the computing device(s) 402. In some examples, the annotations may be presented based on a geo-fence or other predefined location. As shown in FIG. 4, annotation 412 comprises textual data asking a user "Do you need groceries?" In this case, the annotation may be associated with a geo-fence associated with a local grocery store a user of computing device 402 frequents. In response to determining that a location 416 of computing device(s) 402 is within a geo-fence or at a predefined location, presentation module 214 may automatically present annotation 412. As shown in FIG. 4, annotation 414 may comprise image data, such as an image of a police car with a siren. This may serve as a reminder to slow down as that the segment 410, or portion of the segment 410, often has police cars on patrol or speed traps. In some instances, annotation 414 may additionally be associated with a geo-fence or other predefined location. Alternatively, annotations 412 and 414 may be input into annotation module 212 by a user and associated with particular instructions. Although graphical representation 406 illustrates a bird's eye of the instructions in instruction list 404 graphically overlaid onto a map, in other instances, graphical representation 406 may comprise other types of viewpoints (e.g., three-dimensional view, satellite view, etc.). While illustrated as a Cop image, annotations 414 may comprise any type of content input by a user. For instance, annotation 414 may comprise text input by a user and state "there is a great flower stand on this corner."

The graphical representation 406 may further include ink data 418. As shown, ink data 418 may include one or both of an arrow and text presented on the graphical representation 418. In some examples, the text in ink data 418 may be handwritten text input by a user, type written text input by a user, voice text input by a user that has been converted to written text, or a combination of any of these. Further, instructions list 404 may further have modified text 420 corresponding to ink data 418. In some examples, the modified text 420 may be the same as, or different than the ink data 418 text. In some instances, only a portion of modified text 420 is shown in ink data 418 on the graphical representation 408. In various instances, the modified text 420 may be audibly presented to a user, and only a portion of modified text 420 may be presented visually to a user, as shown in ink data 418. In some instances, ink data 418 may help a user navigate the route shown in graphical representation 406. For example, a tree may block a street sign for a street the user must take a turn onto for traversing the route. The ink data 418 may include an arrow to illustrate more clearly where them user needs to take a turn. The presentation module may, in some examples, include instructions for interpreting text, such as optical character recognition (OCR) instructions. In this way, input text, such as ink data 418, may be interpreted and used to modify the modified text 420. In various examples, various annotations, such as ink data 418, may be presented either visually, audibly, or a combination of both by presentation module 214. For instance, ink data 418 may be presented visually in user interface 400, and may additionally be output audibly, such via an audio speaker of a computing device (e.g., audio speaker of I/O interface(s) 220).

As shown in FIG. 4, instructions list may further include one or more icons 422. In some instances, icon 422 may represent the type of annotation associated with, or modification made to, the instructions list and/or graphical representation. As shown, icon 422 illustrates that the annotation 414 is an image annotation representing the Cops. In various instances, the instructions list 404 may present one or more icons 422, or audibly indicate that annotations represented by annotation 414 is approaching.

In further examples, the instructions list 404 may further present a plurality of selectable instruction options for traversing the route. One or more of the instruction options may be represented by icons, such as icon 422, to help identify the type of annotation or modifications included in that particular instruction list.

Figure 5:
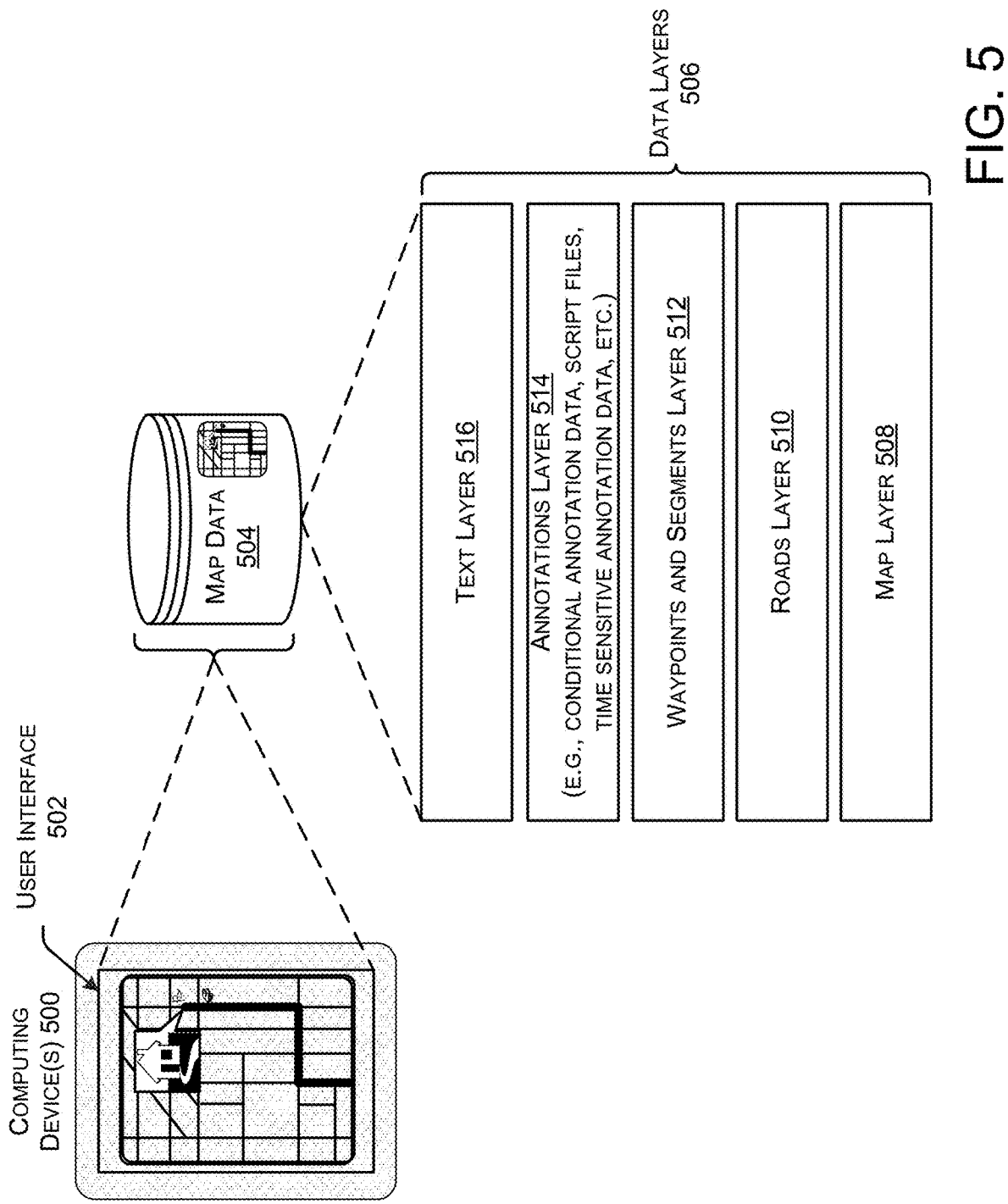
FIG. 5 is a schematic diagram showing example data layers of a graphical representation of instructions on a map presented in a user interface on a display of a computing device.

FIG. 5 is a schematic diagram showing example data layers of a graphical representation of instructions on a map presented in a user interface on a display of a computing device.

Computing device(s) 500 may comprise any type of computing device usable to modify and present instructions for traversing a route, such as computing device(s) 200. As shown in FIG. 5, computing device(s) 500 may comprise a display for displaying a user interface 502. User interface 502 may present a graphical representation of instructions for traversing a route on a map. In some examples, the graphical representation may be stored in map data 504. Map data 504 (e.g., map data 216) may comprise computer-readable media configured to store information, such as instructions for traversing a route, and modifications or annotations to the instructions. The map data may store map data, instructions, modifications, and annotations in one or more data layers 506.

Data layers 506 may comprise a plurality of individual data layers. As described herein, a data layer is a layer of data presented on a map layer that is capable of individual manipulation. In other words, one data layer may be manipulated without affecting another data layer. For example, one data layer may be moved and interacted with independent of and without affecting another data layer. Further, individual data layers of data layers 504 may be associated with other layers of data layers 504 based on geographic locations, as will be described in more detail below.

In some examples, data layers 506 may comprise a map layer 508, a roads layer 510, a waypoints and segments layer 512, an annotations layer 514, and/or a text layer 516. The map layer 508 may comprise a map of a geographic region. For instance, map layer 508 may include cities, natural geographic formations (e.g., rivers, mountains, lakes, etc.), or other non-moveable geographic features. Roads layer 510 may be disposed on top of map layer 508 and may comprise established roads, trails, or other transportation channels. Waypoints and segments layer 512 may comprise waypoints and segments contained in instructions for traversing a route. Annotations layer 514 may comprise annotations associated with the waypoints and segments layer 512. For instance, annotations layer 514 may comprise data associated with the waypoints and segments layer 512, such as textual data, image data, audio data, ink data, video data, three-dimensional object data, and any other type of annotations data (e.g., conditional annotation data, script files, time sensitive annotation data, etc.). Text layer 516 may comprise textual instructions associated with waypoints and segments layer 512. For instance, text layer 546 may comprise text data corresponding to waypoints and segments layer 512 that is read audibly to a user and/or presented visually to a user.

While the data layers 506 are described as including five layers, in various examples, any of the five layers may be combined or further subdivided into additional layers. Further, in some examples, additional layers may be added to and interspersed between the layers of data layers 506. Data layers 506 may be stored in map data 504 in various formats. For example, data layers 506 may comprise computer languages such as Extensible Markup Language (XML), Keyhole Markup Language (KML), JavaScript Object Notation (JSON), or any other type of computer language or file type usable to present data.

In some examples, the individual data layers are associated with each other. For instance, a waypoint of the waypoints and segments layer 512 may be associated with (i.e., linked to) a particular location on the roads layer 510 and/or map layer 508. Similarly, an annotation in annotations layer 514 may be associated with a waypoint or segment in waypoints and segments layer 512.

In some examples, individual manipulation of a layer results in changes in that layer. For example, a user of computing device(s) 500 may interact with waypoints and segments layer 512 by moving the position of the waypoints and segments layer 512 relative to the other layers. In such instances, waypoints and segments layer 512 may be modified, such as by adding or deleting a waypoint or segment based on the movement or interaction with the waypoints and segments layer 512.

Example Processes

The processes described in FIGS. 6 and 7 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations descried herein may, but need not be implemented using the computing device 200. By way of example and not limitation, the processes 600 and 700 are described in the context of the architecture of FIG. 1 and computing device(s) 200. For example, the operations may be performed by one or more of application(s) 208, map application 210, annotation module 212, and/or presentation module 214.

Figure 6:
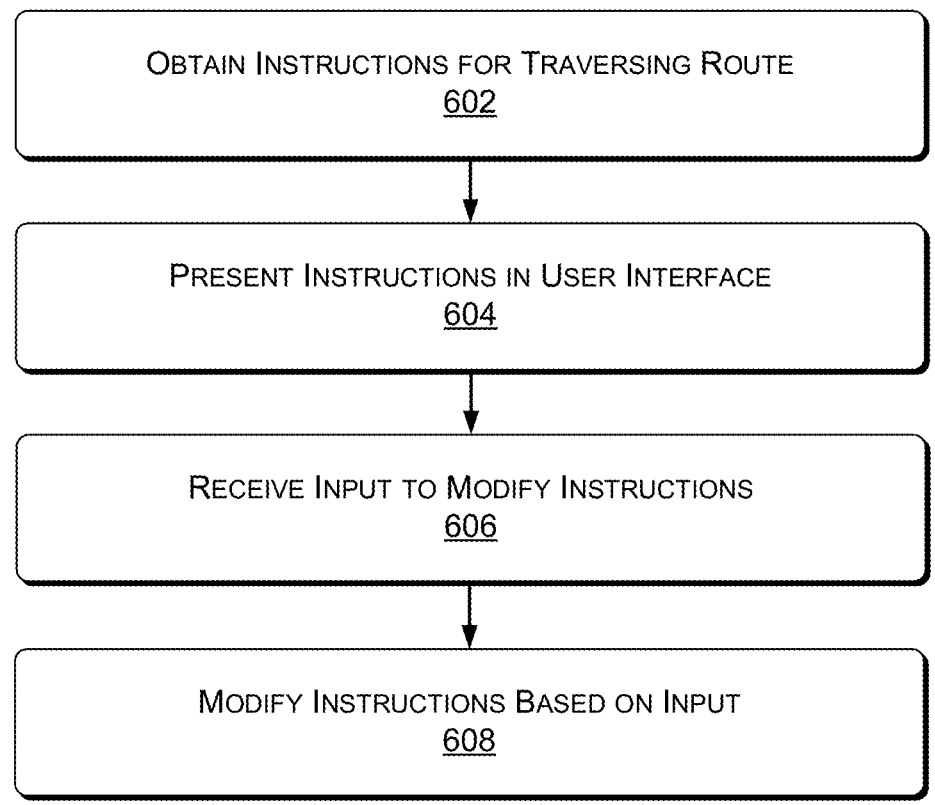
FIG. 6 is a flow diagram showing an example process for modifying original instructions for traversing a route.

FIG. 6 is a flow diagram showing an example process 600 for modifying original instructions for traversing a route.

Block 602 illustrates obtaining instructions for traversing a route from a start location to an end location. In some examples, one or both of annotation module 212 and/or map application 210 may obtain the instructions for traversing the route. In some examples, the instructions may comprise original instructions and may be obtained from a service, such as mapping service(s) 106. In various examples, obtaining the instructions may comprise presenting, by the annotation module 212, a plurality of instructions corresponding to respective route to traverse from the start location to the end location. Further, a selection may be received of the instructions from the plurality of instructions. In various examples, the instructions may comprise waypoints and segments spanning the distance between the waypoints.

Block 604 illustrates presenting the instructions in a user interface on a display associated with the computing device, such as computing device(s) 200. In some examples, annotation module 212 may present a list of textual instructions representing the waypoints and the segments. In other examples, annotation module 212 may present the waypoints and the segments on a map by mapping the waypoints and the segments to positions on the map corresponding to the route.

In some instances, the annotation module 212 may display, via a user interface and on a display of a computing device, the waypoints and the segments on a map by mapping the waypoints and the segments to positions on the map corresponding to the route, the waypoints and the segments comprising a first layer of data presented in the user interface and the map comprising a second layer of data presented in the user interface.

Block 606 illustrates receiving input to modify the instructions. In some examples, annotation module 212 may receive the input. In some examples, receiving the input may comprise receiving an instruction to add a waypoint to the waypoints. The annotation module 212 may identify a location on the route to include the waypoint and adjust the route to include the waypoint. In some examples, the annotation module 212 may include an auto-correct feature to recalculate the route based on an added and/or deleted waypoint or segment. In other examples, the annotation module 212 may receive input including receiving a selection of an edit control that, in response to being selected, causes presentation of an annotation interface usable to modify the instructions. In some examples, receiving the input may comprise receiving input to edit the instructions. For example, upon detecting a touch or other interaction with the instructions, the annotation module 212 may automatically enable editing of the instructions. For instance, a user may position a cursor next to text they wish to modify, or simply start writing, with a finger, pen stylus, or other input device, on the instructions. A user may start writing text to be associated with a segment or waypoint, or drawing shapes to be associated with a segment or waypoint of the instructions. In some examples, a user interface receiving the user input may automatically enable or allow editing. For instance, upon receiving input, the user interface may switch to an editing mode in which the annotation module 212 receives inputs from the user.

Block 608 illustrates modifying instructions based on the input received. In some examples, modifying the instructions may comprise at least one of adding, by annotation module 212, an instruction to the instructions or removing, by annotation module 212, an instruction from the instructions based at least in part on the movement of the first layer relative to the second layer. In various examples, modifying the instructions, by annotation module 212, may comprise at least one of modifying text associated with a waypoint or a segment of the instructions, adding a waypoint or a segment to the instructions, deleting a waypoint or segment from the instructions, associating an image with a waypoint or segment of the instructions; associating a reminder with a waypoint or a segment of the instructions, or associating audio data with a waypoint or a segment of the instructions. Further, in some instances, modifying the instructions may comprise associating, by annotation module 212, an annotation with a waypoint of the waypoints, the annotation comprising a suggestion to take one of a first route or a second route based on one or more conditions, the one or more conditions comprising at least one of traffic conditions, weather conditions, or scenic conditions. In some examples, modifying the instructions may comprise associating ink data (e.g., text, shapes, etc.) with a waypoint or segment of the instructions. In various examples, modifying the instructions may comprise associating video data and/or three-dimensional virtual object data with a waypoint or segment of the instructions.

In various examples, once the instructions have been modified, the instructions may be sent, via network interfaces and/or communication connections of the computing device, to another computing device. In some examples, the modified instructions may be sent to a mapping service, such as mapping service(s) 106. In various examples, the modified instructions may additionally or alternatively be sent to another computing device, such as an end-user computing device. The instructions may be sent using any type of network and communication means (e.g., text, email, etc.).

Figure 7:
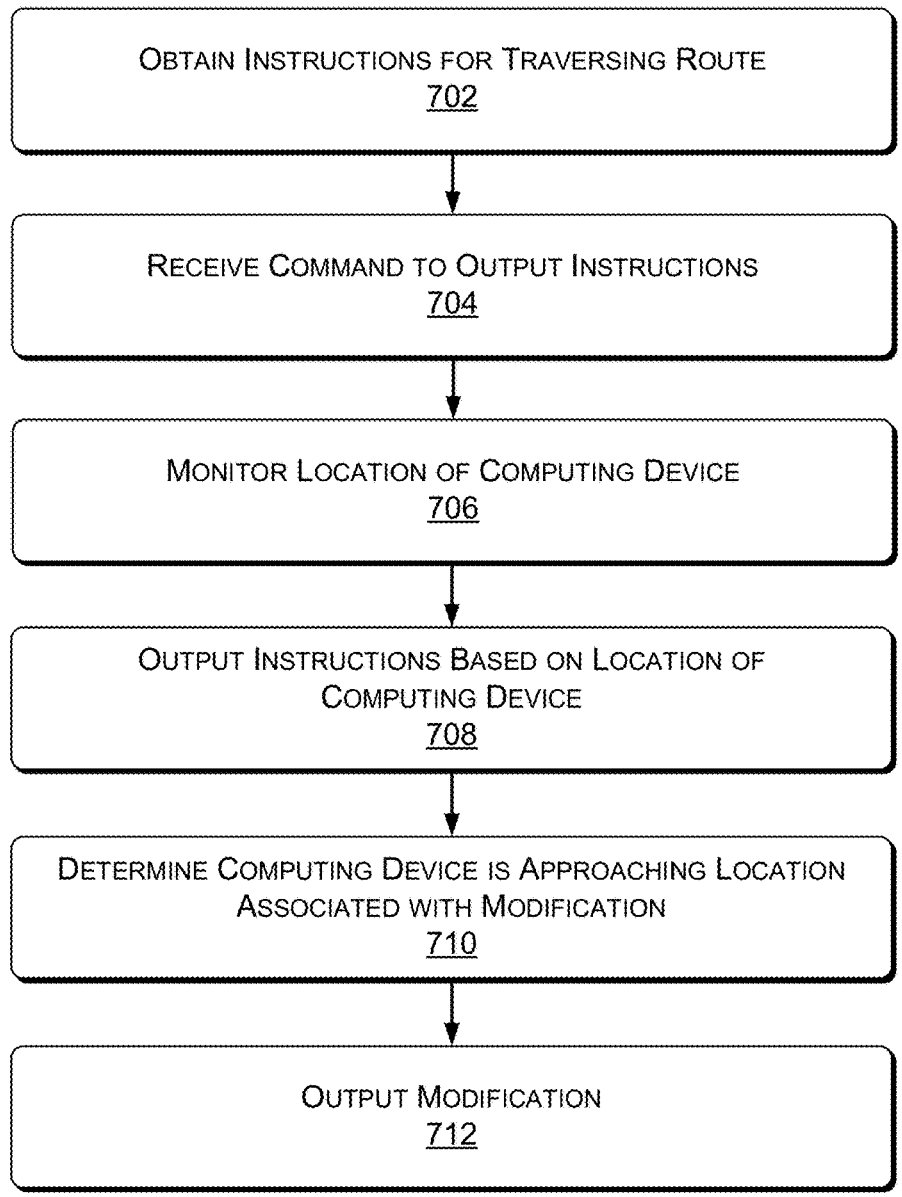
FIG. 7 is a flow diagram showing an example process for presenting modifications in instructions for traversing a route.

FIG. 7 is a flow diagram showing an example process for presenting modifications in instructions for traversing a route.

Block 702 illustrates obtaining instructions for traversing a route from a start location to an end location, where the instructions include original instructions and modifications to the original instructions. The original instructions may be obtained by one or more of map application 210 and/or presentation module 214, and from mapping service(s) 106. In some examples, obtaining the instructions may comprise identifying a first route and a second route comprising at least one annotation provided by a user associated with the computing device. For instance, the first route and second route may comprise routes in which the user has already interacted with. Further, obtaining the instructions may include presenting, on a display associated with a computing device, a first route and a second route from the start location to the end locations and an icon associated with at least one of the firth route or the second route. The icon may represent an annotation included in the at least one of the first route or the second route.

Block 704 illustrates receiving a command to output the instructions. In some instances, presentation module 214 may receive a command to output the instructions. For instance, a graphical user interface may include a "start" button that is selectable to being outputting the instructions. In other examples, presentation module may determine, based on the location of the computing device presenting the instructions that the computing device has begun to traverse the route and output the instructions.

Block 706 illustrates monitoring a location of the computing device on the route. For example, presentation module 214 may interact with one or more location systems, such as GPS, to determine a location of a computing device traversing the route.

Block 708 illustrates outputting the instructions for traversing the route based at least in part on the location of the computing device. In some examples, presentation module 214 may determine an order in which to present the original instructions and the modifications to the original instructions, and output turn-by-turn directions based at least in part on the order. In various examples, presentation module 214 may output the instructions by outputting a first portion of the instructions via the computing device and outputting a second portion of the instructions via a second computing device. In some instances, the presentation module 214 may output the instructions by interpreting the modifications to the original instructions, determining, based at least in part on the interpreting, that an original instruction from the original instructions has been modified, and output the original instruction that has been modified.

Block 710 illustrates determining that the computing device is approaching a location on the route associated with a modification of the modifications to the original instructions. In some examples, the modification may comprise an annotation associated with the instructions.

Block 712 illustrates outputting the modification. In some examples, the presentation module 214 may output the modification by presenting an annotation associated a waypoint or a segment of the instructions, the annotation comprising at least one of an image, a reminder, ink data, video data, three-dimensional object data, or audio data. In other examples, the modification may comprise an annotation associated with a waypoint or a segment of the instructions, and outputting the modification may comprise determining that the annotation comprises a user-input suggestion to take one of a first route or a second route to reach the end location based on one or more conditions, the one or more conditions comprising at least one of traffic conditions, weather conditions, or scenic conditions; and outputting the suggestion to take the first route. In some examples, the user-input suggestion may comprise a suggestion input by a user regarding the traffic conditions, weather conditions, or scenic conditions. Further, the suggestion may indicate which route to take from multiple routes based on the conditions.

While the operations are described as being implemented by one or more computing devices, in other examples various systems of computing devices may be employed. For instance, a system of multiple devices may be used to perform any of the operations noted above in conjunction with each other. For example, a car with an internal computing device along with a mobile computing device may be employed in conjunction to perform these operations.

Example Clauses

A. A computing device comprising: one or more processors; and memory communicatively coupled to the one or more processors and storing computer-readable instructions that, when executed, cause the one or more processors to perform operations comprising: obtaining instructions for traversing a route from a start location to an end location, the instructions comprising waypoints along the route and segments spanning between the waypoints; presenting the instructions in a user interface on a display associated with the computing device; receiving, via the user interface and from a user associated with the computing device, input to modify the instructions; and modifying the instructions based at least in part on the input.

B. A computing device as paragraph A recites, wherein obtaining instructions comprises: presenting a plurality of instructions corresponding to respective routes to traverse from the start location to the end location; and receiving a selection of the instructions from the plurality of instructions.

C. A computing device as paragraph A or B recite, wherein presenting the instructions comprises at least one of: presenting a list of textual instructions representing the waypoints and the segments; or presenting the waypoints and the segments on a map by mapping the waypoints and the segments to positions on the map corresponding to the route.

D. A computing device as any of paragraphs A-C recite, wherein receiving the input comprises receiving an instruction to add a waypoint to the waypoints, the operations further comprising: identifying a location on the route to include the waypoint; and adjusting the route to include the waypoint.

E. A computing device as any of paragraphs A-D, wherein receiving the input includes: receiving input to edit the instructions; and in response to receiving the input, causing presentation of an annotation interface usable to modify the instructions.

F. A computing device as any of paragraphs A-E, wherein modifying the instructions comprises at least one of the following: modifying text associated with a waypoint or a segment of the instructions; adding a waypoint or a segment to the instructions; deleting a waypoint or segment from the instructions; associating an image with a waypoint or segment of the instructions; associating ink data with a waypoint or segment of the instructions; associating video data with a waypoint or segment of the instructions; associating a three-dimensional virtual object with a waypoint or segment of the instructions; associating a reminder with a waypoint or a segment of the instructions; or associating audio data with a waypoint or a segment of the instructions.

G. A computing device as any of paragraphs A-F, the operations further comprising sending, by network interfaces of the computing device, the modified instructions to another computing device.

H. A computing device as any of paragraphs A-G, wherein the input comprises an annotation, and modifying the instructions comprises: associating the annotation with a waypoint of the waypoints, the annotation comprising a suggestion to take one of a first route or a second route based on one or more conditions, the one or more conditions comprising at least one of traffic conditions, weather conditions, or scenic conditions.

I. A computer-implemented method comprising: obtaining, by one or more processors of a computing device, instructions for traversing a route from a start location to an end location, the instructions including original instructions and modifications to the original instructions; receiving a command to output the instructions for traversing the route; monitoring a location of the computing device on the route; outputting the instructions for traversing the route based at least in part on the location of the computing device; determining, by the one or more processors and based at least in part on the location of the computing device, that the computing device is approaching a location on the route associated with a modification of the modifications to the original instructions; and outputting the modification.

J. A computer-implemented method as paragraph I recites, wherein obtaining the instructions comprises: identifying a first route and a second route comprising at least one annotation provided by a user associated with the computing device; presenting, on a display associated with the computing device, the first route and the second route from the start location to the end location and an icon associated with at least one of the first route or the second route, the icon representing an annotation included in the at least one of the first route or the second route; and receiving a selection of the first route.

K. A computer-implemented method as paragraph I or J recite, wherein outputting the instructions for traversing the route comprises: determining an order in which to present the original instructions and the modifications to the original instructions; and outputting turn-by-turn directions based at least in part on order.

L. A computer-implemented method as any of paragraphs I-K recite, wherein outputting the instructions comprises outputting a first portion of the instructions via the computing device and outputting a second portion of the instructions via a second computing device.

M. A computer-implemented method as any of paragraphs I-L recite, wherein outputting the instructions comprises: interpreting the modifications to the original instructions; determining, based at least in part on the interpreting, that an original instruction from the original instructions has been modified; and outputting the original instruction that has been modified.

N. A computer-implemented method as any of paragraphs I-M recite, wherein the modification comprises an annotation associated with the instructions, and outputting the modification comprises presenting a visual indicator representing the annotation on a display associated with the computing device.

O. A computer-implemented method as any of paragraphs I-N recite, wherein outputting the modification comprises presenting an annotation associated a waypoint or a segment of the instructions, the annotation comprising at least one of an image, a reminder, ink data, video data, three-dimensional object data, or audio data.

P. A computer-implemented method as any of paragraphs I-O recite, wherein the modification comprises an annotation associated with a waypoint or a segment of the instructions, and wherein outputting the modification comprises: determining that the annotation comprises a user-input suggestion to take one of a first route or a second route to reach the end location based on one or more conditions, the one or more conditions comprising at least one of traffic conditions, weather conditions, or scenic conditions; and outputting the suggestion to take the first route.

Q. A system comprising: one or more processors; one or more displays; memory communicatively coupled to the one or more processors and storing: a map layer; original instructions for traversing a route represented on the map layer, the route comprising waypoints and segments; one or more modifications to the original instructions, the one or more modifications modifying at least one of a map view or a list view of the original instructions; and computer-readable instructions that, when executed by the one or more processors, perform acts comprising: interpreting the original instructions and the one or more modifications; determining final instructions based at least in part on the interpreting; and outputting the final instructions.

R. A system as paragraph Q recites, further comprising a presentation module stored in the memory and comprising computer-readable instructions that, when executed by the one or more processors: present the map layer as a first layer on the one or more displays; present roads of an area represented on the map layer as a second layer on the one or more displays; present the waypoints and the segments of the route as a third layer on the one or more displays; present one or more annotations of the modifications as a fourth layer on the one or more displays; and present text representing the final instructions as a fifth layer on the one or more displays.

S. A system as paragraph Q or R recite, wherein the one or more modifications include an annotation associated with a waypoint or a segment of the route; and further comprising a presentation module stored in the memory and comprising computer-readable instructions that, when executed by the one or more processors, present a visual portion of the final instructions on the one or more displays as a three-dimensional representation, the presenting including: identifying a viewpoint at which the three-dimensional representation is being presented on the one or more displays; and based at least in part on the viewpoint, presenting text of the annotation along a plane substantially parallel to a plane defined by the one or more displays.

T. A system as any of paragraphs Q-T recite, wherein the one or more modifications include an annotation associated with a waypoint or a segment of the route, the annotation including a script file that, when executed by the one or more processors, identifies one or more of: traffic conditions associated with a portion of the route; weather conditions associated with a portion of the route; or an estimated amount of time required to traverse the distance between the waypoint or the segment of the route and an end destination of the route.

U. A computer-implemented method comprising: means for obtaining, by one or more processors of a computing device, instructions for traversing a route from a start location to an end location, the instructions including original instructions and modifications to the original instructions; receiving a command to output the instructions for traversing the route; means for monitoring a location of the computing device on the route; means for outputting the instructions for traversing the route based at least in part on the location of the computing device; means for determining, by the one or more processors and based at least in part on the location of the computing device, that the computing device is approaching a location on the route associated with a modification of the modifications to the original instructions; and means for outputting the modification.

V. A computer-implemented method as paragraph U recites, wherein obtaining the instructions comprises: means for identifying a first route and a second route comprising at least one annotation provided by a user associated with the computing device; means for presenting, on a display associated with the computing device, the first route and the second route from the start location to the end location and an icon associated with at least one of the first route or the second route, the icon representing an annotation included in the at least one of the first route or the second route; and means for receiving a selection of the first route.

W. A computer-implemented method as paragraph U or V recite, wherein outputting the instructions for traversing the route comprises: means for determining an order in which to present the original instructions and the modifications to the original instructions; and means for outputting turn-by-turn directions based at least in part on order.

X. A computer-implemented method as any of paragraphs U-W recite, wherein outputting the instructions comprises means for outputting a first portion of the instructions via the computing device and outputting a second portion of the instructions via a second computing device.

Y. A computer-implemented method as any of paragraphs U-X recite, wherein outputting the instructions comprises: means for interpreting the modifications to the original instructions; means for determining, based at least in part on the interpreting, that an original instruction from the original instructions has been modified; and means for outputting the original instruction that has been modified.

Z. A computer-implemented method as any of paragraphs U-Y recite, wherein the modification comprises an annotation associated with the instructions, and outputting the modification comprises means for presenting a visual indicator representing the annotation on a display associated with the computing device.

AA. A computer-implemented method as any of paragraphs U-Z recite, wherein outputting the modification comprises means for presenting an annotation associated a waypoint or a segment of the instructions, the annotation comprising at least one of an image, a reminder, ink data, video data, three-dimensional object data, or audio data.

AB. A computer-implemented method as any of paragraphs U-Z recite, wherein the modification comprises an annotation associated with a waypoint or a segment of the instructions, and wherein outputting the modification comprises: means for determining that the annotation comprises a user-input suggestion to take one of a first route or a second route to reach the end location based on one or more conditions, the one or more conditions comprising at least one of traffic conditions, weather conditions, or scenic conditions; and means for outputting the suggestion to take the first route.

AC. One or more computer-readable media encoded with instructions that, when executed by a processor, configure a computer to perform a computer-implemented method as any of paragraphs I-P recite.

AD. A device comprising one or more processors and one or more computer-readable media encoded with instructions that, when executed by the one or more processors, configure a computer to perform a computer-implemented method as any of paragraphs I-P recite.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

As described above, while the disclosure describes classifiers that use decision forests, many of the techniques described herein can be performed using other classification or regression algorithms, such as neural networks, deep learning neural networks, adaptive boosting, or any other classification or regression algorithm.

What is claimed is:

1. A computing device comprising:
   one or more processors;
   a display; and
   memory communicatively coupled to the one or more processors and storing computer-readable instructions that, when executed, cause the one or more processors to perform operations comprising:
      obtaining, via a network from a mapping service, instructions for traversing a route from a start location to an end location, the instructions comprising waypoints along the route and segments spanning between the waypoints, wherein the mapping service corresponds to a repository for storing one or more instructions for a plurality of users;
      presenting the instructions in a user interface on the display;
      receiving, via the user interface and from a user associated with the computing device, an input to modify the instructions, wherein the input comprises an instruction to add a waypoint and an associated annotation corresponding to the waypoint to the waypoints;
      identifying a location on the route to include the waypoint and the associated annotation;
      adjusting the route to include the waypoint, wherein one or more sub-routes associated with the waypoint are provided from the location on the route corresponding to the waypoint to the end location of the route, and wherein the associated annotation includes a script file configured to perform one or more operations for determining one or more suggestions between the one or more sub-routes to be presented via the user interface of the display;
      modifying the instructions based at least in part on the input; and
      outputting the modified instructions on the user interface of the display.

2. The computing device of claim 1, wherein obtaining instructions comprises:
   presenting a plurality of instructions corresponding to respective routes to traverse from the start location to the end location; and
   receiving a selection of the instructions from the plurality of instructions.

3. The computing device of claim 1, wherein presenting the instructions comprises at least one of:
   presenting a list of textual instructions representing the waypoints and the segments; or
   presenting the waypoints and the segments on a map by mapping the waypoints and the segments to positions on the map corresponding to the route.

4. The computing device of claim 1, wherein receiving the input includes:
   receiving input to edit the instructions; and
   in response to receiving the input, causing presentation of an annotation interface usable to modify the instructions.

5. The computing device of claim 1, wherein modifying the instructions comprises at least one of the following:
   modifying text associated with the waypoint or a corresponding segment of the instructions;

adding the waypoint or the corresponding segment to the instructions;

deleting a second waypoint or a second segment from the instructions;

associating an image with the waypoint or the corresponding segment of the instructions;

associating ink data with the waypoint or the corresponding segment of the instructions;

associating video data with the waypoint or the corresponding segment of the instructions;

associating a three-dimensional virtual object with the waypoint or the corresponding segment of the instructions;

associating a reminder with the waypoint or the corresponding segment of the instructions; or associating audio data with the waypoint or the corresponding segment of the instructions.

6. The computing device of claim 1, the operations further comprising sending, by network interfaces of the computing device, the modified instructions to another computing device.

7. The computing device of claim 1, wherein modifying the instructions comprises:

associating the associated annotation with the waypoint, the associated annotation comprising a suggestion to take one of a first route or a second route based on one or more conditions, the one or more conditions comprising at least one of traffic conditions, weather conditions, or scenic conditions.

8. A computer-implemented method comprising:

obtaining, via a network by one or more processors of a computing device having a display, instructions for traversing a route from a start location to an end location, the instructions including original instructions and a modification to the original instructions, wherein the original instructions are obtained via the network from a mapping service corresponding to a repository for storing one or more instructions for a plurality of users, and wherein the modification to the original instructions includes an instruction to add a waypoint and an associated annotation corresponding to the waypoint to a location on the route, and wherein one or more sub-routes associated with the waypoint are provided from the location on the route corresponding to the waypoint to the end location of the route, and wherein the associated annotation includes a script file configured to perform one or more operations for determining one or more suggestions between the one or more sub-routes to be presented via the user interface of the display;

receiving a command to output the instructions for traversing the route;

monitoring a location of the computing device on the route using one or more Global Positioning System (GPS) location systems to determine the location of the computing device traversing the route;

outputting the instructions for traversing the route based at least in part on the location of the computing device;

determining, by the one or more processors and based at least in part on the location of the computing device, that the computing device is approaching the location on the route associated with the modification to the original instructions; and outputting the modification on a user interface of the display.

9. The computer-implemented method of claim 8, wherein obtaining the instructions comprises:

identifying a first route and a second route comprising at least one annotation provided by a user associated with the computing device;

presenting, on a display associated with the computing device, the first route and the second route from the start location to the end location and an icon associated with at least one of the first route or the second route, the icon representing an annotation included in the at least one of the first route or the second route; and receiving a selection of the first route.

10. The computer-implemented method of claim 8, wherein outputting the instructions for traversing the route comprises:

determining an order in which to present the original instructions and the modification to the original instructions; and outputting turn-by-turn directions based at least in part on order.

11. The computer-implemented method of claim 8, wherein outputting the instructions comprises outputting a first portion of the instructions via the computing device and outputting a second portion of the instructions via a second computing device.

12. The computer-implemented method of claim 8, wherein outputting the instructions comprises:

interpreting the modification to the original instructions;

determining, based at least in part on the interpreting, that an original instruction from the original instructions has been modified; and outputting the original instruction that has been modified.

13. The computer-implemented method of claim 8, wherein outputting the modification comprises presenting a visual indicator representing the associated annotation on a display associated with the computing device.

14. The computer-implemented method of claim 8, wherein outputting the modification comprises presenting the associated annotation, the waypoint, or at least one corresponding segment of the instructions, the associated annotation comprising at least one of an image, a reminder, ink data, video data, three-dimensional object data, or audio data.

15. The computer-implemented method of claim 8, wherein the modification comprises the associated annotation associated with the waypoint or one of the corresponding segments of the instructions, and wherein outputting the modification comprises:

determining that the associated annotation comprises a user-input suggestion to take one of a first route or a second route to reach the end location based on one or more conditions, the one or more conditions comprising at least one of traffic conditions, weather conditions, or scenic conditions; and outputting the suggestion to take the first route.

16. A system comprising:

one or more processors;

one or more displays;

memory communicatively coupled to the one or more processors and storing:

a map layer associated with map data obtained via a network from a mapping service, the mapping service corresponding to a repository for storing one or more instructions for a plurality of users;

original instructions for traversing a route represented on the map layer, the route comprising waypoints and segments;

one or more modifications to the original instructions, the one or more modifications modifying at least one of a map view or a list view of the original instructions, wherein the one or more modifications include an instruction to add a waypoint and an associated annotation corresponding to the waypoint to a location on the route, wherein one or more sub-routes associated with the waypoint are provided from the location on the route corresponding to the waypoint to the end location of the route, and wherein the associated annotation includes a script file configured to perform one or more operations for determining one or more suggestions between the one or more sub-routes to be presented via the user interface of the display; and computer-readable instructions that, when executed by the one or more processors, perform acts comprising:
interpreting the original instructions and the one or more modifications;
determining final instructions based at least in part on the interpreting; and
outputting the final instructions on a user interface of the one or more displays.

17. The system of claim 16, further comprising a presentation module stored in the memory and comprising computer-readable instructions that, when executed by the one or more processors:
present the map layer as a first layer on the one or more displays;
present roads of an area represented on the map layer as a second layer on the one or more displays;
present the waypoints and the segments of the route as a third layer on the one or more displays;
present one or more annotations of the modifications as a fourth layer on the one or more displays; and
present text representing the final instructions as a fifth layer on the one or more displays.

18. The system of claim 16, further comprising:
a presentation module stored in the memory and comprising computer-readable instructions that, when executed by the one or more processors, present a visual portion of the final instructions on the one or more displays as a three-dimensional representation, the presenting including:
identifying a viewpoint at which the three-dimensional representation is being presented on the one or more displays; and
based at least in part on the viewpoint, presenting text of the associated annotation along a plane substantially parallel to a plane defined by the one or more displays.

19. The system of claim 16, wherein the one or more processors identifies one or more of:
traffic conditions associated with a portion of the route;
weather conditions associated with a portion of the route; or an estimated amount of time required to traverse the distance between the waypoint or a corresponding segment of the route and an end destination of the route.

* * * * *